United States Patent [19]

Stana

[11] 3,721,623

[45] March 20, 1973

[54] METHOD OF IMPROVING THE SALT REJECTION OF SEMIPERMEABLE REVERSE OSMOSIS MEMBRANES

[75] Inventor: Regis R. Stana, Murrysville, Pa.

[73] Assignee: Westinghouse Electric Corporation, Pittsburgh, Pa.

[22] Filed: July 23, 1971

[21] Appl. No.: 165,458

[52] U.S. Cl. ................... 210/23, 210/321, 210/433, 210/500
[51] Int. Cl. .............................................. B01d 13/00
[58] Field of Search ................. 210/23, 321, 433, 500

[56] References Cited

UNITED STATES PATENTS 3,170,867  2/1965  Lueb et al.................210/500 X

Primary Examiner—Frank A. Spear, Jr.
Attorney—F. Shapoe et al.

[57] ABSTRACT

A method of improving the salt rejection of supported semipermeable membranes comprises contacting the membrane with sodium phosphate and alkyl or alkylaryl sulfonates.

8 Claims, 1 Drawing Figure

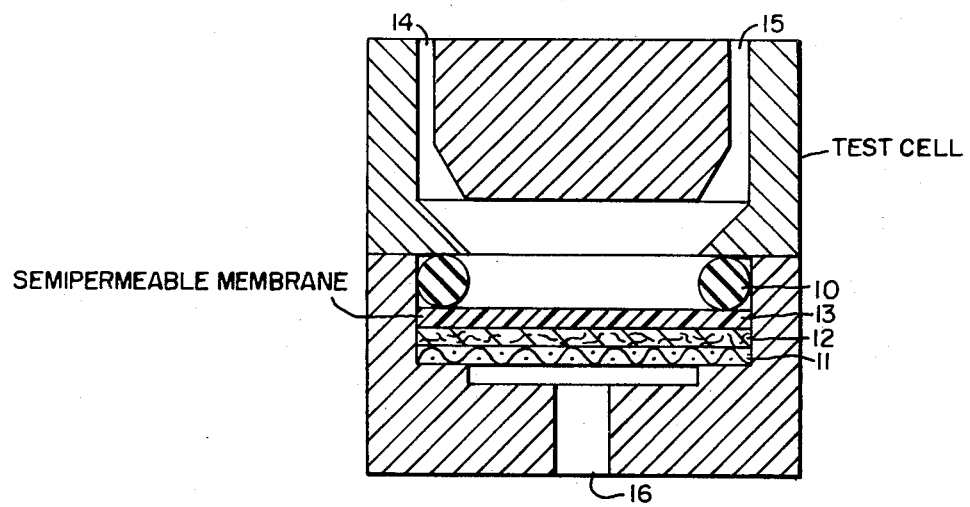

METHOD OF IMPROVING THE SALT REJECTION OF SEMIPERMEABLE REVERSE OSMOSIS MEMBRANES

BACKGROUND OF THE INVENTION

Many semipermeable membranes have been fabricated which are capable of passing pure water while rejecting a large portion of dissolved solids in the feed water. These membranes generally incorporate aqueous magnesium perchlorate of formamide in an acetone solution of cellulose acetate. Many feed water additives have also been found which, when added to the feed to be purified, form a dynamic membrane on a "poor or leaky" cellulose acetate membrane and give high salt rejection. Examples of such feed water additives are: organic polyelectrolytes, colloidal dispersions of hydrous oxides, solutions of hydrolyzable ions, ground-up low-cross-linked ion-exchange beads and certain natural products such as clays and humic acid. All of these feed additives, however, while reducing the rejection of dissolved solids, also reduce the pure water product flux.

SUMMARY OF THE INVENTION

I have found that contacting a cellulose acetate membrane with effective amounts of sodium phosphate and alkyl sulfonates and/or alkylaryl sulfonates will increase the impurity rejection rate of the membrane, without any appreciable decrease in product water flux, and this increase in rejection will not decrease when the additives are no longer present in the feed.

BRIEF DESCRIPTION OF THE DRAWINGS

For a better understanding of the invention, reference may be made to the preferred embodiments, exemplary of the invention, shown in the accompanying drawing, which shows a cross sectional illustration of one of the reverse osmosis cells used in determining flux and rejection rates of the high pressure semipermeable membranes of this invention.

DESCRIPTION OF THE PREFERRED EMBODIMENTS

Osmosis occurs when two solutions of different concentrations in the same solvent are separated from one another by a semipermeable membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "revers osmosis," "pressure osmosis" and "hyper-filtration" are used to describe this process. A detailed analysis of this phenomena can be found in U. Merten, *Desalination By Reverse Osmosis*, M.I.T. Press, 1966.

An interesting peculiarity of semipermeable cellulose acetate reverse osmosis membranes, is that they will only reject salt, or other solute impurities, if the osmotic skin side of the membrane is in contact with the contaminated feed. The cellulose acetate osmotic skin side of the membrane is extremely thin, about 0.2 microns, and has minute passageways through it. It is also very dense, and is the side that is effective in holding back the dissolved impurities in the feed. The remainder of the membrane structure is a spongy, porous, cellulose acetate sublayer material that accounts for about 99.8% of the membrane's thickness. Its function is mainly supportive.

The membranes used to purify the feed can be made of a cellulose ester, usually modified cellulose acetate compositions by methods well known in the art and described, for example, in U.S. Pat. Nos. 3,344,214, 3,310,488 and 3,133,132. Generally, the membranes are cast against and supported by a flat porous substrate or within axial bores through a porous support module, such as one made of resin bonded filler particles. The casting solution generally contains about 25 wt.% cellulose acetate, 45 wt.% acetone and 30 wt.% formamide. The membranes are leached in cold water after casting, to form a dense osmotic skin.

The process by which the dense osmotic skin of the cellulose acetate membrane does its job is complex. One theory is that the polymer has strong hydrogen bonding groups that enhance the bonding of water. The molecules of water migrate from one hydrogen bond site to the next within this dense osmotic skin layer through minute foraminous passageways. After this effusion through the active osmotic skin layer, they recombine and flow through much more porous cellulose acetate supportive layer.

In the method of my invention, anionic materials which are surface active agents having structurally unsymmetrical molecules containing both hydrophilic and hydrophobic groups are added to the feed fluid which contacts the supported reverse osmosis membrane in a reverse osmosis system. These materials are anionic and comprise about 40–90 wt.% of a sodium phosphate, such as trisodium ortho-phosphate ($Na_3PO_4$) and sodium tripolyphosphate ($Na_5P_3O_{10}$), and about 10–50 wt.% synthetic detergents such as alkyl sulfonates and/or alkylaryl sulfonates having the formula:

where n = 5-18. Particularly suitable sulfonates include the straight chain alkyl sulfonate, sodium lauryl sulfonate ($C_{12}H_{25}$—$SO_3Na$), and the alkylaryl sulfonate, sodium dodecylbenzene sulfonate ($C_{12}H_{25}$—$C_6H_4$—$SO_3Na$). The preferred range of the additives of this invention is about 25–40 wt.% sodium alkyl and/or sodium alkylaryl sulfonate detergent and about 50–75 wt.% sodium phosphate.

The exact mechanism by which the additives affect the membrane characteristics is not precisely known at this time. The additives are surface active, with respect to the water-membrane interface. It is thought that effective amounts of the additive, when added to the feed water, line the surface of the osmotic skin, giving it a more negative charge and holding both Na+ and Cl− ions at the surface, thus improving salt rejection. The phosphate is also thought to combine with calcium or magnesium carbonate in the feed water (about 50 PPM of $H_2O$) to form a complex which becomes insoluble at the membrane interface and plugs up "leaky" or defective portions of the membrane, thus blocking passage of the large Na+ and Cl− ions.

I found an effective amount of additive to be between about 60–500 parts additive per million parts feed liquid. An initial addition of the additives increased rejection of dissolved solids by the membrane and this improvement lasted for a considerable time without the addition of more additive to the feed. Besides feed addition, the additive may be coated or sprayed on the membrane in dilute aqueous solution.

The reverse osmosis apparatus used for testing flat membranes was of the standard type, and used stainless steel or (polymethylmethacrylate) as construction materials. Round cells were used for testing 1.0 to 2.0 inch diameter flat membranes. This cell, used in the Example, is shown in the drawing. The feed water side seal is made with a rubber O ring 10. The product side collection consisted of fine stainless steel wire cloth 11 covered with two layers of paper 12, with the paper contacting the cast semipermeable membrane 13. Feed water is fed in opening 14, which is angled to distribute the feed water against the osmotic skin side of the semipermeable membrane and out opening 15. Purified water is removed through opening 16 behind the semipermeable membrane.

EXAMPLE I

A casting solution was prepared containing about 24 wt.% cellulose acetate, 47 wt.% acetone and 29 wt.% formamide (methanamide). The solid cellulose acetate was added to the other liquid ingredients to give a viscous liquid casting solution. This viscous casting solution was poured into a film casting apparatus containing a blade with an opening of about 16 mils. The casting apparatus was 1 foot long and it was hand drawn across a 1 foot × 1 foot glass plate in about 5 seconds to give a casting about 7¼ inches square. The liquid solution poured through the opening in the casting apparatus during this time to form a film on the glass plate. The casting was allowed to air dry for about 5 seconds to give a total air dry time of about 10 seconds. The glass plate and casting apparatus were at room temperature. The glass plate with the casting was then immersed in a leaching bath at 32°F, prepared from a mixture of water and crushed ice. After 20 minutes, the semipermeable membrane casting, about 5 mils thick and having an osmotic skin layer, was separated from the glass plate. A small sample about 1.75 inches diameter was cut out of the uncured semipermeable membrane.

This sample was mounted in the standard stainless reverse osmosis apparatus heretofore described and illustrated in the drawing with the osmotic skin side of the membrane facing the feed water entrance. Tap water containing 100 PPM (parts per million) dissolved solids was fed into the reverse osmosis cell against and contacting the membrane at 200 psi and 25°C. The uncured semipermeable membrane operated at 57 percent rejection of undissolved solids with a purified water flux of 45 gal/sq. ft.-day.

Then, 80 PPM of a detergent additive material was added to the tap water, containing 100 PPM dissolved solids, and fed into the reverse osmosis apparatus described above at 200 psi and 25°C. The additive contained about 50 wt.% sodium tripolyphosphate, 40 wt.% sodium lauryl sulfonate and 10 wt.% bulk as carboxy methyl cellulose and sodium sulfate. The uncured semipermeable membrane operated at 69 percent rejection of undissolved solids with a purified water flux of 41.4 gal/sq. ft.-day. As can be seen a dramatic improvement in % rejection resulted from the additive with only moderate decrease in pure water flux.

A variety of other impurities were added to the tap water, containing 100 PPM dissolved solids, fed against the same supported membrane using the same test cell and operating conditions, and the following fluxes and rejections were obtained:

TABLE I

| Feed | Flux (gal/ft.² day) | %Rejection |
|---|---|---|
| Tap water (approx. 100 PPM dissolved solids) | 45 | 57 |
| Tap water +80 PPM additive* | 41.4 | 69 |
| Tap water + 80 PPM additive* +100 PPM MgSO₄ | 38 | 70 |
| Tap water + 80 PPM additive* +100 PPM MgSO₄ +100 PPM NaCl | 37.7 | 57 |
| Tap water +160 PPM additive* +100 PPM MgSO₄ +100 PPM NaCl | 37 | 62 |
| Tap water through "treated" membrane after 7 days | 42.5 | 68 |

*Approx. 50 wt.% phosphate, 40 wt.% sulfonate, 10 wt.% bulk

Each time the additive was dissolved in the feed water contacting the membrane, the rejection increased with the only decrease in flux being due to the increase in osmotic pressure of the feed from the addition of the detergent additive. When returning to a feed of tap water containing only 100 PPM dissolved solids using the same membrane which had been "treated" by additive contact after 7 days of running, the flux was almost back to the initial level, but the rejection stayed at the increased level.

I claim:

1. A method of improving impurity rejection rates of a semipermeable membrane by contacting the semipermeable membrane with an effective amount of detergent additive, said additive comprising sodium phosphate, and sulfonates selected from the group consisting of sodium alkyl sulfonates, sodium alkylaryl sulfonates and mixtures thereof.

2. The method of claim 1, wherein the semipermeable membrane is supported in a reverse osmosis apparatus and feed liquid contacts the membrane, said detergent additive being added to the feed liquid.

3. The method of claim 2, wherein the membrane is a cellulose ester membrane and the detergent additive is added in the ratio of between about 60–500 parts additive per million parts feed liquid.

4. The method of claim 2, wherein the sulfonate is selected from the group of sulfonates having the formula:

$$C_nH_{2n+1}-SO_3Na, C_nH_{2n+1}-(C_6H_4)-SO_3Na$$

and mixtures thereof, where $n = 5-18$.

5. The method of claim 4, wherein sodium phosphate comprises 40–90 wt.% of the additive and sulfonates comprise 10–50 wt.% of the additive.

6. The method of claim 4, wherein the membrane is a modified cellulose acetate membrane supported by a support made of bonded, resin coated filler particles.

7. The method of claim 4, wherein the phosphate is selected from the group consisting of $Na_3PO_4$ and $Na_5P_3O_{10}$.

8. The method of claim 4, wherein the detergent is added to the feed liquid once.

* * * * *